March 1, 1966

K. A. SENSE 3,238,395

CATHODE FOR THERMIONIC ENERGY CONVERTER

Filed April 5, 1962

INVENTOR.
KARL A. SENSE
BY Edwin Coates
·ATTORNEY·

March 1, 1966  K. A. SENSE  3,238,395
CATHODE FOR THERMIONIC ENERGY CONVERTER
Filed April 5, 1962  2 Sheets-Sheet 2

INVENTOR.
KARL A. SENSE
BY
Edwin Coates
ATTORNEY.

3,238,395
CATHODE FOR THERMIONIC ENERGY CONVERTER
Karl A. Sense, Woodland Hills, Calif., assignor, by mesne assignments, to Douglas Aircraft Company, Inc., Santa Monica, Calif.
Filed Apr. 5, 1962, Ser. No. 185,441
14 Claims. (Cl. 310—4)

This invention relates to thermionic energy converters and in particular to a novel cathode construction for use in such converters which operates at significantly higher efficiencies than conventional cathodes without increasing the vaporization losses of the cathode material.

Present day thermionic energy converters, operating on known principles, have been shown to be entirely feasible and it is anticipated that they will have widespread utility if various drawbacks can be overcome. Briefly, the type of device under consideration comprises a cathode and an anode within a sealed chamber which may be merely evacuated or filled with a suitable plasma. The cathode is heated to cause it to emit electrons which are transported to the collector surface of the relatively cool anode. The plasma facilitates the transport of the electrons by neutralizing the space charge between the electrodes.

The operating life of a cathode depends greatly on its operating temperature. The rate of evaporation of the cathode material increases with temperature and therefore its life varies inversely as a function thereof. Tungsten, tantalum, and several other materials have been found suitable for cathodes and will have a reasonable working life at temperatures of the order of 2,000 degrees K. However, at these temperatures the power density and efficiency obtained are not as high as desirable. Considerably higher power densities and a much higher power output can be achieved when the cathode is operated at about 3,000 degrees K. However, the principal drawback in operating at such a high temperature is that the life of the cathode is shortened. It is therefore desirable to improve the performance of the converter to such an extent that it yields sufficiently high power densities and efficiencies at temperatures considerably below 3,000 degrees K., thus providing an adequate life for the cathode.

Several proposals have been tried with some degree of success. In one proposal the cathode and anode have basically planar faces in close proximity, the face of the cathode being serrated or grooved to increase the emission surface. In another proposal the cathode is formed as a tube with one end closed and with the anode situated across the open end in closely spaced relation. Each of these forms provides increased emission surface area. However, the heat radiation surface and the evaporation surface are also increased. Hence, there is little gain, if any, in efficiency of the converter and the life of the cathode.

All of the difficulties mentioned above are overcome by the unique construction of the present invention. In one illustrative configuration the novel cathode has a block type form, which is conventional, with a flat smooth face forming an emission surface placed in close-spaced juxtaposition to a conventional anode having a corresponding flat smooth face forming a collector surface. The electrodes are placed in a sealed chamber which may be evacuated or provided with a suitable plasma. One well known and suitable material for providing this plasma is cesium vapor.

For the same surface temperature the external emission surface of this cathode will emit electrons at the same rate and density as a conventional block type electrode. In addition, the body of the cathode is formed with one or more cavities having electron emitting walls. These cavities are completely enclosed except for one or more restricted passages leading to the external emission surface. Electrons will be emitted from the cavity walls in proportion to their area. While some of the electrons so emitted will return to the cavity walls a large proportion of them will exit through the passages and be transported to the anode along with those electrons which are emitted by the external surface.

All of the heat radiated by the cavity walls will be absorbed by the opposite walls except that portion which is radiated through the passages. For the case where the diameter of the passages is quite small, say about 1% of the total planar area, black body conditions very nearly exist in the cavities. This implies that the rate of heat loss by radiation through the passages is increased by a factor of about 3 over that which would be lost by radiation from the external surface in the area occupied by each passage. However, since that area is only about 1% of the total planar area the total rate of heat loss by radiation is increased by only about 3% over that for the conventional cathode even though the electron flow has been greatly increased. For the case where the area of the passages is much larger, black body conditions no longer exist so that there will be essentially no increased rate of heat loss by radiation. Hence, the total heat loss by radiation for such a cathode will be essentially the same as that for a conventional cathode.

The external surface will, of course, evaporate at the same rate as would a conventional cathode at the same operating temperature. However, there is no increase in evaporation because of the cavities. This results from the fact that the diameter of the passage is so chosen that, at the usual operating temperature of the cathode, the mean free path of the vapor molecules of the cathode material is of the order of at least ten times the diameter of the passage. Hence each cavity operates as a Knudsen cell. This implies that the vaporization loss of cathode material from the interior of the cavity is equivalent to that which would occur from an external surface equal in area to that of the passage. An accommodation coefficient of unity is assumed here, which is certainly reasonable.

The diameter and number of passages or apertures are determined so that their total area will approximate one to ten percent of the total area of the external emission surface. Hence, it is clear that as contrasted with a conventional cathode design this novel cathode configuration provides a greatly increased electron emitting area while the effective evaporation area has not increased at all and the effective radiation area only very slightly.

Various other advantages and features of novelty will become apparent as the description proceeds in connection with the accompanying drawing, in which.

Figure 1:
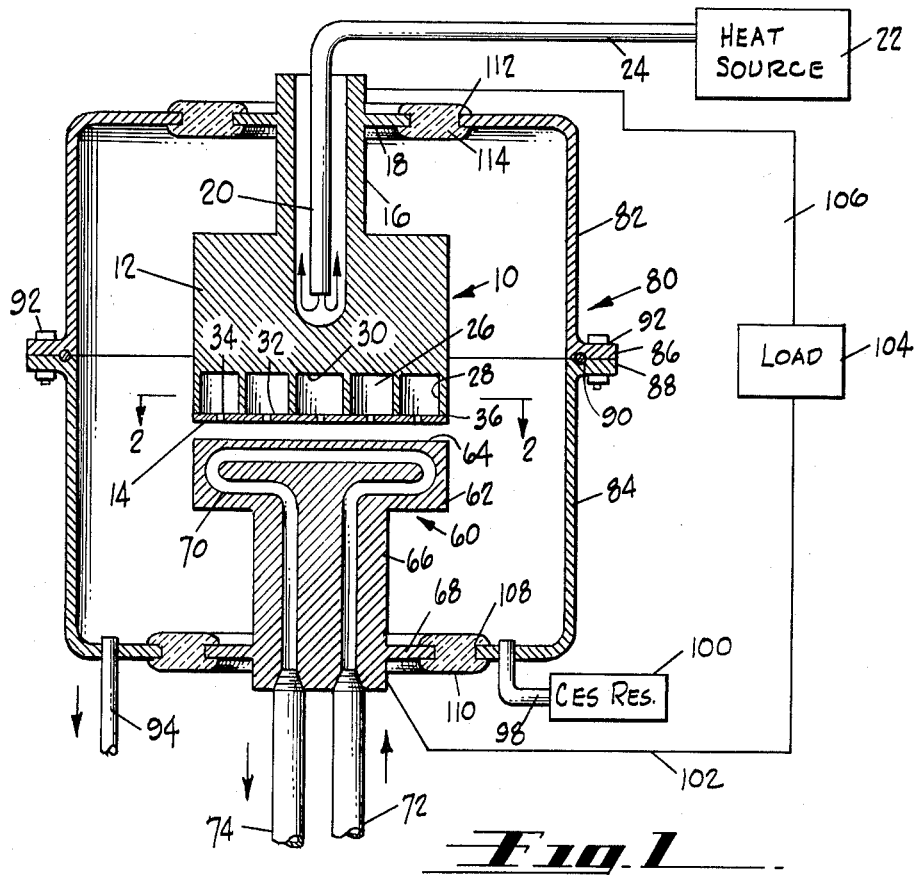
FIGURE 1 is a vertical sectional view of a typical thermionic energy converter incorporating the cathode of the present invention.

A typical idealized representation of a thermionic energy converter incorporating one preferred form of the novel cathode is illustrated in FIGURE 1. In this figure, cathode 10 and anode 60 are shown mounted in a chamber 80. The latter comprises two box-like shells 82, 84, provided with mating peripheral flanges 86, 88. The flanges grip a gasket 90 between them and are held in tightly assembled relation by bolts 92 or other suitable fastening means to form a hermetically sealed chamber or container.

A conduit 94 leads from the interior of the container to a vacuum pump, not shown, to evacuate the container to any desired degree. Reservoir 100 is provided to contain cesium metal. This reservoir is kept at a temperature which will produce the appropriate cesium pressure to give maximum efficiency of operation of the device. Conduit 98 connects the cesium reservoir to the container. The electron flow resulting from operation of the device passes from anode 60 through conduit 102 to load 104 and thence through conduit 106 back to cathode 10.

The anode may be of any conventional type and is here illustrated as comprising a body having a head portion 62 provided with a smooth flat front face 64 constituting an electron collector surface, and a rearwardly extending shank portion 66 carrying a peripheral flange 68. Shell 84 is provided with an opening 108. Flange 68 is arranged in co-planar alignment with the shell wall and is rigidly secured and hermetically sealed in position by an annular ceramic seal 110. Any suitable insulator may be used for this purpose. Cooling passage 70 is formed in the shank and head portions and is connected to supply and return lines 72 and 74 leading to any suitable source of cooling fluid.

Cathode 10 is generally conventional in external form and comprises an emitter body 12 having a forward substantially smooth flat face 14 constituting an external emission surface arranged in juxtaposition to face 64 of the anode. The gap between the electrodes is greatly exaggerated for clarity of illustration. In practice it may be as small as 5 to 10 mils. The body is carried by shank 16 which bears a peripheral flange 18. Shell 82 is formed with an opening 112 in its end wall and flange 18 is arranged within the opening in co-planar alignment with the shell end wall, being rigidly secured and hermetically sealed in position by an annular ceramic seal 114. Any suitable insulating material may be used for this purpose. Passage 20 provides access for a supply of heat to maintain the emitter body at the desired operating temperature. Heat source 22 supplies heat such as gases of combustion or the like to the body by means of a conduit 24.

Figure 2:
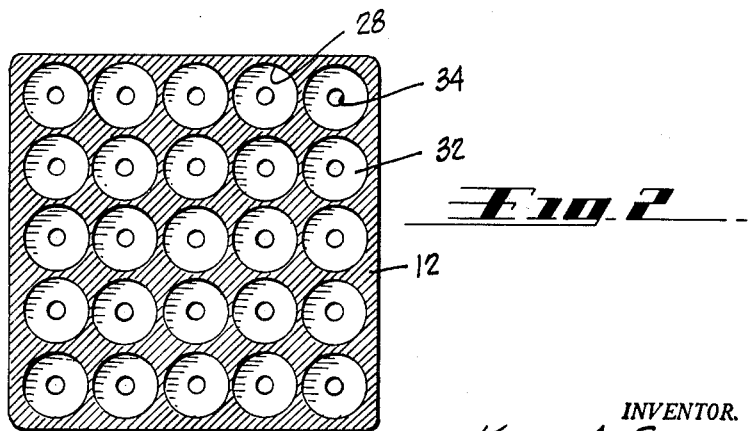
FIGURE 2 is a cross sectional view in plan of the novel cathode, taken on line 2—2 of FIGURE 1.

In the form of the invention depicted in FIGURES 1 and 2, the emitter body is formed adjacent its external emission surface with one or more cavities 26, here indicated as generally cylindrical in form although they may take other shapes without impairing their utility. The cavities have electron emitting wall surfaces 28, 30, 32 and communicate with the external emission surface by means of restricted apertures or passages 34. The cavities and passages may be formed in a unitary casting by the use of removable cores but, as a practical matter, the flat face of the body is drilled to produce the cavities and a thin plate, layer, or the like 36 with the apertures 34 formed therein is then secured to the body by percussion welding or any other means forming a satisfactory bond. The emitter body may be of tungsten, tantalum, or any of the other materials suitable for such cathode, and if closure or cover plate 36 is made separate as suggested above it is normally of the same material. With cylindrical cavities shown, it is presently preferred to make the cavity depth of the order of one fourth to one times the diameter.

It will be apparent that, at the selected operating temperature, the external emission surface will function in the same way as the emission surface of any conventional solid block cathode. The electron density will be the same although the total electron flow will be less by an amount corresponding to the total area of passages 34 which is of the order of one to ten percent of the total area of the emission surface.

The internal emission surfaces of the cavity walls as shown have a total area of about two to four times that of the external emission surface. All of these surfaces emit electrons at approximately the same rate as the external surface. In the confined space many of the electrons re-enter the walls but a large proportion of them exit through passages 34 and are transported across the gap to collector surface 64. Consequently the actual area and the effective area of the emission surface are greatly increased without any corresponding increase in bulk or weight.

Heat will be radiated from face 14 to face 64 in almost the same quantity and at almost the same rate as for a solid block emitter body at the same temperature. All of the heat radiated from the cavity walls strikes opposite walls and is absorbed except for the very few heat rays which reach and pass through the passages or apertures 34. As explained previously, the total increase in the rate of heat loss by radiation will not exceed about three percent. Thus it will be seen that the increase in power density or electron flow has been achieved with only a small increase in radiation, and the emitter body hence has an effective emission surface area substantially greater than its effective radiation surface area.

Face 14 will have an evaporation rate of cathode material the same as that of the emission face of a solid block emitter body operating at the same temperature. The cavity surfaces will have a corresponding actual rate but not a corresponding effective rate. This is accomplished by sizing the apertures or passages so that their diameter or maximum lateral dimension is substantially less than the mean free path of the cathode material at the operating temperature. Preferably the dimension is of the order of ten percent of such mean free path. Under these circumstances each cavity operates as a Knudsen cell. This means that the loss due to vaporization from the interior of the cavity is equivalent to that which would occur from an area equal to the area of the passage from the cavity. Hence the emitter body has an effective electron emission surface area substantially greater than the effective evaporation surface area.

More than one passage may be provided per cavity if desired. Also some or all of the cavities may be combined, for instance, by extending the peripheral edge slightly forward of the balance of the face of the body and securing closure plate 36 thereto so that there is internal communication between all of the cavities.

Figure 3:
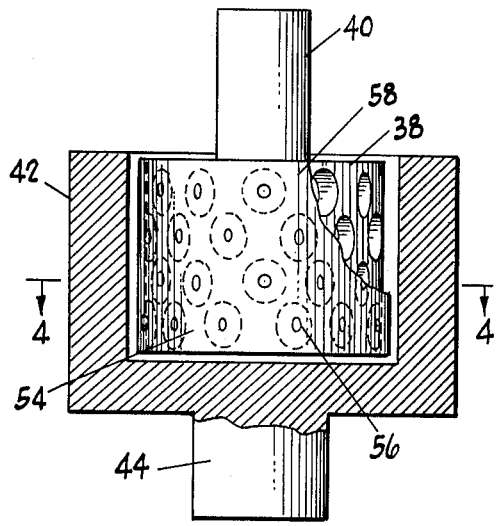
FIGURE 3 is an elevational view, partly in section and partly broken away, of another embodiment of the invention.
Figure 4:
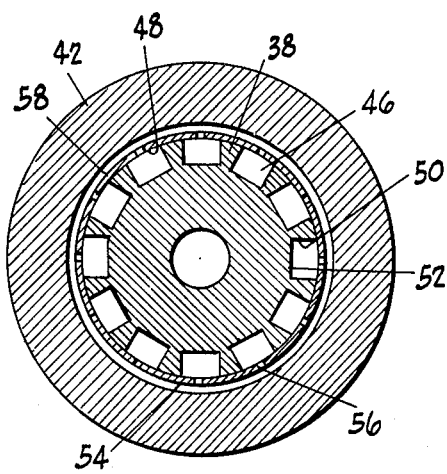
FIGURE 4 is a cross sectional view in plan taken on line 4—4 of FIGURE 3.

A cathode having practically all of the same features, characteristics, and functions as the cathode of FIGURE 1 may be formed, as shown in FIGURES 3 and 4, as a cylindrical block cooperating with an anode in the form of a cylindrical tubular member. The cathode includes a cylindrical emitter body 38 having a supporting shank 40. The body is surrounded by the tubular portion 42 of the anode, carried by supporting shank 44. As best seen in FIGURE 4, a plurality of radially extending cavities 46 are formed along the length of the emitter body. These cavities have electron emitting walls 48, 50, and 52 and communicate with the cylindrical face 54, constituting the external emission surface, by way of passages or apertures 56. As in the case of FIGURE 1, the cavities may be formed in integral fashion or by machining, and a tubular closure 58 may then be fitted over the cavities and secured in place.

It will be readily appreciated that this embodiment of the invention functions in a manner substantially identical to that of FIGURE 1. The emission surfaces of face 54 and the cavity walls add together to greatly increase the effective emission surface while the effective evaporation surface remains the same and the effective radiation surface increases only slightly for the reasons outlined above. It is also possible to interchange functions, making portion 42 the emitter body and forming the cavities therein. However it is more difficult to manufacture and presents no particular advantages.

Figure 5:
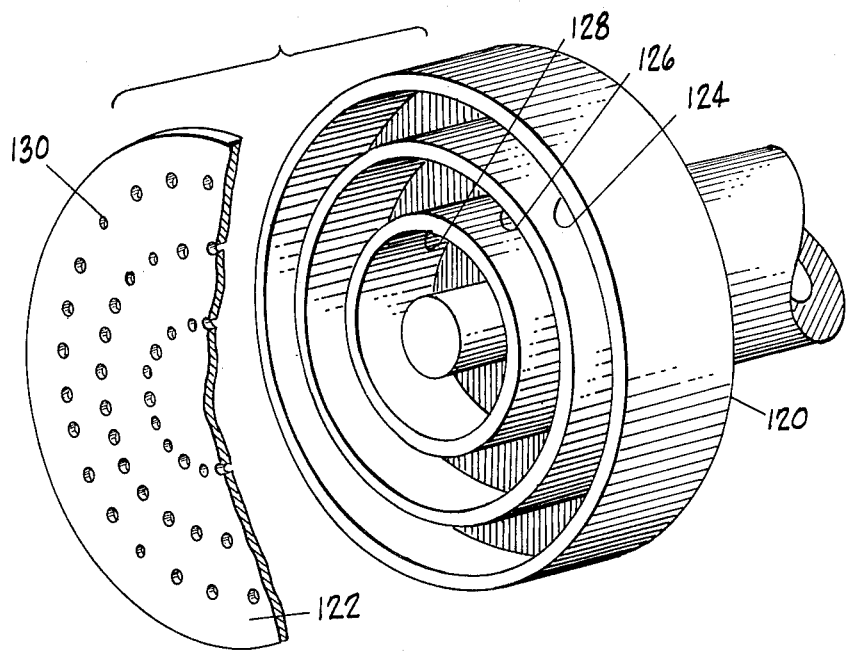
FIGURE 5 is an exploded perspective view, partly broken away, showing a further embodiment of the invention.

The embodiments of FIGURE 5 is quite similar to that of FIGURE 1. Body 120 is annular in plan form and has a flat front face which may be formed by closure plate 122. Instead of a plurality of generally cylindrical cavities, the internal emission surface is provided by the formation of a series of concentric annular grooves or channels 124, 126, 128 of about the same depth as the cavities of FIGURE 1. A plurality of passages or apertures 130 are formed in the closure member 122 in a concentric annular ring-like pattern and provide egress for electrons from the channels to the collector surface of the anode.

The novel cathode construction described in detail above provides a great increase in efficiency over known cathode constructions by achieving substantially greater power density at any given operating temperature. One result of this improvement is that a desired power density can be obtained at a lower operating temperature for the novel cathode. An immediate consequence of this is a longer life for the novel cathode.

Obviously, many modifications and variations of the present invention are possible in the light of the above teachings. It is, therefore, to be understood that within the scope of the appended claims the invention may be practiced otherwise than as specifically described herein.

I claim:

1. A cathode for a thermionic energy converter, comprising: an emitter body having a generally planar wall; a plurality of substantially concentric annular cavities formed in said wall, said cavities having electron emitting wall surfaces; a closure plate overlying said body wall and said cavities and being secured to said body wall, said closure plate having a smooth flat external emission surface; and apertures formed in said plate in a pattern of concentric circles corresponding to said annular cavities and communicating with said cavities to provide egress for electrons emitted by the cavity wall surfaces.

2. A cathode for a thermionic energy converter, comprising: an emitter body having an external emission surface; cavity means formed within said body and having internal emission surfaces; and passage means for egress of electrons from said cavity means; the internal emission surface area being of the order of two to four times the external emission surface area.

3. In a thermionic energy converter, the combination of a cathode and an anode; said cathode comprising an emitter body having a substantially smooth external emission surface; cavity means formed within said body and having walls constituting emission surfaces; and restricted passage means extending from said cavity means to said external emission surface and providing egress for electrons emitted from said wall surfaces; said anode having a substantially smooth collector surface of approximately the same area as the external emission surface of said cathode and located in juxtaposition thereto to provide direct paths for electrons from all parts of the external emission surface and from said passage means; said internal and external emission surfaces being effective to emit electrons at elevated temperatures and in the absence of externally applied electric potential, to convert substantially all of the energy supplied to it from heat to electric power.

4. The combination as claimed in claim 3 in which the total cross sectional area of said passage means is of the order of one to ten percent of the area of said external emission surface.

5. The combination as claimed in claim 3 in which the maximum lateral dimension of said passage means is substantially less than the mean free path of the vapor molecules of the material of said cathode.

6. The combination as claimed in claim 5 in which said maximum lateral dimension does not exceed approximately ten percent of said mean free path.

7. In a thermionic energy converter, the combination of a cathode and an anode; said cathode comprising an emitter body having an external emission surface; cavity means formed within said body and having walls constituting emission surfaces; and restricted passage means extending from said cavity means to said external emission surface and providing egress for electrons emitted from said wall surfaces; said anode having a collector surface of approximately the same area as the external emission surface of said cathode and located in juxtaposition thereto; means to apply heat to said cathode to raise it to an elevated temperature; said internal and external emission surfaces being effective to emit electrons at said elevated temperature in substantially greater quantity than is possible with a solid emitter body of the same size operating under the same conditions; said heat being the only form of energy supplied to said cathode to produce electric power.

8. A thermionic energy converter comprising: an evacuated casing; a cathode and an anode within said casing; said cathode comprising an emitter body of electron emissive material and having an external emission surface; cavity means formed within said body and having walls constituting emission surfaces, said cavities and walls being free of extraneous electron emissive material; and highly restricted passage means extending from said cavity means to said external emission surface and providing egress for electrons emitted from said wall surfaces; said anode having a collector surface of approximately the same area as the external emission surface of said cathode and located in juxtaposition thereto to provide direct paths for transfer of electrons from all parts of the external emission surface and from said passage means to appropriate parts of said collector surface; means to apply heat to said cathode to raise it to a predetermined elevated temperature; said internal and external emission surfaces being effective to emit electrons at said elevated temperature in substantially greater quantity than is possible with a solid emitter body of the same size operating under the same conditions; and means external to said cathode and anode to supply a substance serving to reduce the work function of the emission surfaces; said cathode and anode combination being adapted to convert heat energy to electrical energy and produce a useful current flow solely by the application of heat to said cathode.

9. A converter as claimed in claim 8; the substance serving to reduce the work function being cesium vapor.

10. A converter as claimed in claim 8; and means to withdraw heat from said anode to maintain a high temperature differential between the cathode and anode and attain high efficiency.

11. A cathode for use in a thermionic energy converter, comprising: an emitter body having a substantially smooth external emission surface for placement in juxtaposition to a corresponding collector surface of an anode; cavity means formed within said body and having electron emitting wall surfaces; and restricted passage means extending from said cavity means to said external emission surface and providing egress for electrons emitted from said wall surfaces; said cathode including means to transmit heat energy to said external emission surface and said cavity wall surfaces to raise them to an elevated temperature and constituting the sole source of energy applied to said cathode; said external emission surface and said cavity wall surfaces emitting electrons from their entire areas at said elevated temperature and solely in response thereto, and converting substantially all of the heat energy to electric power; the maximum lateral dimension of said passage means being substantially less than the mean free path of the vapor molecules of the material of said cathode.

12. A cathode as claimed in claim 11 in which said maximum lateral dimension does not exceed approximately ten percent of said mean free path.

13. A cathode as claimed in claim 11 in which said cavity means comprises a plurality of cavities and there is at least one passage means for each cavity, and the total cross sectional area of all of said passage means is of the order of one to ten percent of the area of said external emission surface.

14. A cathode as claimed in claim 11 in which said cavity means comprises a plurality of cavities and the total emission surface area of said cavities is substantially greater than the area of the external emission surface.

References Cited by the Examiner

UNITED STATES PATENTS

| | | | |
|---|---|---|---|
| 2,810,089 | 10/1957 | MacNair | 313—339 |
| 2,926,277 | 2/1960 | White | 313—339 |
| 2,980,819 | 4/1961 | Feaster | 310—4 |

FOREIGN PATENTS 731,454   6/1955   Great Britain.

DAVID J. GALVIN, *Primary Examiner.*